(12) United States Patent
Carolan et al.

(10) Patent No.: US 8,455,382 B2
(45) Date of Patent: Jun. 4, 2013

(54) FABRICATION OF CATALYZED ION TRANSPORT MEMBRANE SYSTEMS

(75) Inventors: Michael Francis Carolan, Allentown, PA (US); Charles Leonard Kibby, Benicia, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 312 days.

(21) Appl. No.: 12/786,987

(22) Filed: May 25, 2010

(65) Prior Publication Data

US 2011/0294653 A1 Dec. 1, 2011

(51) Int. Cl.
*B01J 35/02* (2006.01)
*B01D 53/22* (2006.01)
*B01D 59/12* (2006.01)

(52) U.S. Cl.
USPC .......... 502/4; 502/527.16; 502/325; 502/326; 95/54

(58) Field of Classification Search
USPC ..................................... 502/4, 527.16; 95/54
IPC .......................... B01J 35/02; B01D 53/22,59/12
See application file for complete search history.

(56) References Cited

U.S. PATENT DOCUMENTS

| | | | | |
|---|---|---|---|---|
| 5,073,209 | A * | 12/1991 | Giancola | 505/400 |
| 5,306,411 | A * | 4/1994 | Mazanec et al. | 204/265 |
| 5,534,471 | A * | 7/1996 | Carolan et al. | 502/4 |
| 6,492,290 | B1 | 12/2002 | Dyer et al. | |
| 7,122,072 | B2 * | 10/2006 | Carolan et al. | 95/54 |
| 7,151,067 | B2 * | 12/2006 | Sakon et al. | 501/123 |
| 7,179,323 | B2 | 2/2007 | Stein et al. | |
| 7,279,027 | B2 | 10/2007 | Carolan et al. | |
| 7,425,231 | B2 * | 9/2008 | Carolan et al. | 95/54 |
| 7,468,092 | B2 | 12/2008 | Carolan | |
| 7,893,002 | B2 * | 2/2011 | Farrusseng et al. | 502/4 |
| 2002/0173422 | A1 * | 11/2002 | Bitterlich et al. | 502/302 |
| 2005/0106439 | A1 | 5/2005 | Carolan et al. | |
| 2010/0176347 | A1 | 7/2010 | Richet et al. | |
| 2011/0076213 | A1 | 3/2011 | Carolan et al. | |

FOREIGN PATENT DOCUMENTS

| | | |
|---|---|---|
| EP | 1 637 215 A2 | 3/2006 |
| EP | 2 030 668 A1 | 3/2009 |
| FR | 2 917 307 | 12/2008 |
| JP | 03-500345 | 3/1989 |
| JP | 01-308602 | 12/1989 |
| JP | 2006-347841 | 12/2006 |
| JP | 2007-012284 | 1/2007 |
| WO | 89/02483 A1 | 3/1989 |

OTHER PUBLICATIONS

Adler, Stuart B., Chemical Expansivity of Electrochemical Ceramics, J. Am. Ceram. Soc. 84 (9) 2117-19 (2001).

* cited by examiner

*Primary Examiner* — Jun Li
(74) *Attorney, Agent, or Firm* — Keith D. Gourley; Bryan C. Hoke, Jr.

(57) ABSTRACT

Process for fabricating a catalyzed ion transport membrane (ITM). In one embodiment, an uncatalyzed ITM is (a) contacted with a non-reducing gaseous stream while heating to a temperature and for a time period sufficient to provide an ITM possessing anion mobility; (b) contacted with a reducing gaseous stream for a time period sufficient to provide an ITM having anion mobility and essentially constant oxygen stoichiometry; (c) cooled while contacting the ITM with the reducing gaseous stream to provide an ITM having essentially constant oxygen stoichiometry and no anion mobility; and (d) treated by applying catalyst to at least one of (1) a porous mixed conducting multicomponent metallic oxide (MCMO) layer contiguous with a first side of a dense layer of MCMO and (2) a second side of the dense MCMO layer. In another embodiment, these steps are carried out in the alternative order of (a), (d), (b), and (c).

20 Claims, No Drawings

FABRICATION OF CATALYZED ION TRANSPORT MEMBRANE SYSTEMS

STATEMENT REGARDING FEDERALLY SPONSORED RESEARCH OR DEVELOPMENT

This invention was made in part with Government support under Cooperative Agreement No. DE-FC26-97FT96052 between Air Products and Chemicals, Inc., and the U.S. Department of Energy. The Government has certain rights to this invention.

BACKGROUND OF THE INVENTION

Ceramic materials containing certain mixed metal oxide compositions possess both oxygen ion conductivity and electronic conductivity at elevated temperatures. These materials, known in the art as mixed conducting metal oxides, may be used in applications including gas separation membranes and membrane oxidation reactors. Ceramic membranes are made of selected mixed metal oxide compositions and have been described as ion transport membranes (ITM). Catalysts may be used, for example, to promote the oxidation and/or reforming reactions that take place in membrane oxidation reactors.

A characteristic property of these materials is that their oxygen stoichiometry is a thermodynamic function of temperature and oxygen partial pressure wherein the equilibrium oxygen stoichiometry decreases with increasing temperature and with decreasing oxygen partial pressure. It is known that the dimensions of all materials change with changing temperature due to thermal expansion and contraction. In addition to these thermal dimensional changes, mixed conducting metal oxide materials undergo chemical dimensional changes that are functions of the metal oxide oxygen stoichiometry. At isothermal conditions, an article made of mixed conducting metal oxide material will increase in dimensions with decreasing oxygen stoichiometry. At isothermal conditions, the oxygen stoichiometry decreases with decreasing oxygen partial pressure. Since the equilibrium oxygen stoichiometry increases with decreasing temperature, an article made of mixed conducting metal oxides will contract due to both thermal and chemical dimensional changes as the temperature decreases at a constant oxygen partial pressure. Conversely, an article made of mixed conducting metal oxides will expand by both thermal and chemical dimensional changes as the temperature increases at a constant oxygen partial pressure. This is described in an article entitled "Chemical Expansivity of Electrochemical Ceramics" by S. B. Adler in *J. Am. Ceram. Soc.* 84 (9) 2117-19 (2001).

Dimensional changes therefore result from equilibrium oxygen stoichiometry changes in mixed conducting metal oxide materials. Changing the temperature at a constant oxygen partial pressure or changing the oxygen partial pressure at a constant temperature will change the equilibrium oxygen stoichiometry of the mixed conducting metal oxide material. When a mixed conducting metal oxide is used as an ion transport membrane, for example, an oxygen partial pressure difference across the membrane creates a difference in the equilibrium oxygen stoichiometry at each of the two surfaces of the membrane, which in turn creates the thermodynamic driving force for oxygen ions to diffuse through the membrane.

It is known that temperature gradients in a mixed conducting metal oxide ceramic structure can create differential strains due to differential thermal expansion and contraction. Similarly, oxygen stoichiometry gradients in a ceramic structure can create differential strains due to differential chemical expansion and contraction. This gradient in oxygen stoichiometry may be sufficiently large to create a correspondingly large differential chemical expansion, and therefore large mechanical stresses, that lead to failure of the ceramic structure. It is desirable, therefore, to avoid differential chemical expansion or at least to control the differential chemical expansion to below maximum allowable values.

There is a need in the art for improved methods to reduce the potential for mechanical damage due to dimensional changes during the heating and cooling of mixed conducting metal oxide membrane systems, particularly in the operation of membrane reactor systems under transient conditions of temperature, pressure, and gas composition that may occur during membrane and module fabrication as well as subsequent startup and shutdown of the membrane systems. These needs are addressed by embodiments of the invention disclosed below and defined by the claims that follow.

BRIEF SUMMARY OF THE INVENTION

An embodiment of the invention relates to a process for fabricating a catalyzed ion transport membrane comprising
  (a) providing an ion transport membrane comprising a dense mixed conducting multicomponent metallic oxide layer having a first side, a second side, and a porous mixed conducting multicomponent metallic oxide layer contiguous with the first side;
  (b) contacting the ion transport membrane with a non-reducing gaseous stream having a first oxygen partial pressure while heating the ion transport membrane to a temperature and for a time period sufficient to provide an ion transport membrane possessing anion mobility;
  (c) contacting the ion transport membrane possessing anion mobility with a first reducing gaseous stream having a second oxygen partial pressure that is less than the first oxygen partial pressure for a time period sufficient to provide an ion transport membrane having anion mobility and essentially constant oxygen stoichiometry;
  (d) cooling the ion transport membrane having anion mobility and essentially constant oxygen stoichiometry while contacting the membrane with the first reducing gaseous stream to provide an ion transport membrane having essentially constant oxygen stoichiometry and no anion mobility; and
  (e) applying a catalyst to at least one of the second side of the dense mixed conducting multicomponent metallic oxide layer and the porous mixed conducting multicomponent metallic oxide layer of the ion transport membrane that has essentially constant oxygen stoichiometry and no anion mobility, thereby providing the catalyzed ion transport membrane.

In an alternative embodiment, a process for fabricating a catalyzed ion transport membrane having essentially constant oxygen stoichiometry and no anion mobility comprises
  (a) providing an ion transport membrane comprising a dense mixed conducting multicomponent metallic oxide layer having a first side, a second side, and a porous mixed conducting multicomponent metallic oxide layer contiguous with the first side;
  (b) applying a catalyst to at least one of the second side of the dense mixed conducting multicomponent metallic oxide layer and the porous mixed conducting multicomponent metallic oxide layer to provide the catalyzed ion transport membrane;
  (c) contacting the catalyzed ion transport membrane with a non-reducing gaseous stream having a first oxygen partial pressure while heating the catalyzed ion transport membrane to a temperature and for a time period sufficient to provide a catalyzed ion transport membrane possessing anion mobility;

(d) contacting the catalyzed ion transport membrane possessing anion mobility with a first reducing gaseous stream having a second oxygen partial pressure that is less than the first oxygen partial pressure for a time period sufficient to provide a catalyzed ion transport membrane having anion mobility and essentially constant oxygen stoichiometry; and (e) cooling the catalyzed ion transport membrane having anion mobility and essentially constant oxygen stoichiometry while contacting the membrane with the first reducing gaseous stream to provide a catalyzed ion transport membrane having essentially constant oxygen stoichiometry and no anion mobility.

DETAILED DESCRIPTION OF THE INVENTION

During startup or shutdown of an oxidation reactor system using mixed conducting metal oxide membranes, the temperature is increased or decreased, the oxygen partial pressure on the oxidant side of the membrane may change, and the reactive gas composition on the reactant side of the membrane may change. The equilibrium oxygen stoichiometry of the membrane material will change in response to the changes in temperature, oxygen partial pressure, and reactant gas composition. Oxygen anions will diffuse into or out of the membrane material and the membrane material will approach its equilibrium oxygen stoichiometry value.

As the oxygen stoichiometry and temperature change, the dimensions of the membrane will change. The time required for the membrane to reach chemical equilibrium with the oxygen partial pressures on the surfaces of the membrane will depend on the oxygen anion diffusion rate into or out of the membrane. The time required for equilibration to occur is a function of the material composition, the temperature, and the dimensions of the membrane modules.

Different membrane compositions will have different oxygen anion diffusivities, and compositions with higher diffusivities will equilibrate with the gas phase faster, all other factors being equal. For a given membrane composition, the oxygen anion diffusivity increases exponentially with temperature. Therefore, equilibration times decrease with increasing temperature. Finally, the equilibration time increases approximately with the square of the characteristic dimension (e.g., length or thickness) of the parts in the membrane modules. Thus thinner parts will equilibrate faster than thicker parts, all other factors being equal. As the thickness of a part increases and as the temperature decreases, it becomes increasingly difficult to keep the interior of the part in equilibrium with the gas phase due to sluggish diffusion of oxygen anions into or out of the part.

Catalyst may be used to promote the oxidation and/or reforming reactions that take place in ion transport membrane oxidation reactors for the production of synthesis gas. In these reactors, the catalyst may be applied in contact with the reactant sides of the dense oxygen ion-permeable membranes and/or in contact with a porous layer contiguous with the reactant side of the dense layer. Alternatively or additionally, catalyst may be applied to the oxidant side of the dense membrane to promote the rate of the surface reaction wherein oxygen anions are produced from oxygen at the surface of the membrane from gas phase species such as molecular oxygen. The catalyst on the oxidant side may be applied in contact with the oxidant side of the dense oxygen ion-permeable membrane and/or in contact with a porous layer contiguous with the oxidant side of the dense layer.

It has been found that catalytic ion transport membranes may fail during start-up because the membrane catalyst can catalyze the reduction of certain compounds in the membrane material by small amounts of oxidizable impurities or fuels in the gas in contact with the membranes during heating to operating temperatures. These oxidizable impurities or fuels may be generated, for example, during heating to operating temperatures by the decomposition of residual contaminants in the membrane reactors. These residual contaminants typically are materials that remain in the membrane modules after fabrication and may include, for example, oil, grease, cleaning compounds, and other organic materials. Alternatively or additionally, oxidizable impurities may be present in the gas introduced into the modules during heating.

Uncontrolled reduction of the membrane material may cause failure of the catalytic membranes due to excessively large oxygen stoichiometry gradients in the membrane structure. This may cause an excessive differential chemical expansion between the reduced, catalyzed porous layer and the non-reduced, non-catalyzed dense layer and other non-reduced components, thereby causing the membrane structure to fail.

The elimination of these residual contaminants and oxidizable impurities during fabrication becomes increasingly difficult as the scale of membrane oxidation reactors increases to commercially-sized systems. These contaminants and impurities are likely to exist, therefore, in all large-scale membrane reactor systems after initial fabrication, and also may exist in the systems after subsequent modification or maintenance procedures.

The problem of destructive uncontrolled catalytic reduction by oxidizable impurities can be avoided by utilizing embodiments of the present invention wherein the materials in the membrane structures are reduced under controlled conditions prior to use of the membranes in reactor vessels under operating conditions. This reducing pretreatment or preconditioning procedure reduces the oxygen stoichiometry uniformly throughout the membrane components such that subsequent exposure of the catalyzed membrane modules to oxidizable impurities will not produce excessive further reduction of membrane material. As discussed in more detail below, the prereduction procedure may be carried out during membrane fabrication either before or after the introduction of catalyst into the membrane structure.

The following definitions apply to terms used in the description and claims for the embodiments of the invention presented herein.

An ion transport membrane is defined as an active dense layer of ceramic membrane material comprising mixed metal oxides capable of transporting or permeating oxygen anions at elevated temperatures. The ion transport membrane also may transport electrons in addition to oxygen ions, and this type of ion transport membrane typically is described as a mixed conductor membrane. The ion transport membrane also may be a composite membrane comprising a layer of dense active membrane material and one or more layers of porous and/or channeled support layers.

A catalyzed ion transport membrane is defined as an ion transport membrane comprising catalyst disposed in contact with the reactant side of the active dense layer and/or in contact with a porous layer contiguous with the reactant side of the dense layer and/or in contact with the oxidant side of the active dense layer. A catalyst is defined as one or more elements and/or compounds that promote (1) reactions that occur on the reactant side of the dense layer and/or in the porous layer contiguous with the reactant side of the dense layer, including the oxidation of species such as hydrogen, carbon monoxide and hydrocarbons, and/or (2) the formation of oxygen anions from gaseous oxygen on the oxidant side of the dense layer. A catalytic material is defined as a material that contains the catalyst and also may include non-catalytic support material that supports the catalyst.

The term "dense" refers to a sintered or fired ceramic material that is impervious to bulk gas flow. Gas cannot flow through dense ceramic membranes made of mixed-conducting multi-component metal oxide material as long as the membranes are intact and have no cracks, holes, or imperfections which allow gas leaks. Oxygen ions can permeate dense ceramic membranes made of mixed-conducting multi-component metal oxide material. The one or more ion transport membranes separating the oxidant zone from the reactant zone allow the permeation of oxygen ions through the membranes, and the membranes do not allow bulk flow of gas between the oxidant and reactant zones of the stage.

The term "anion mobility" is defined as the condition in dense ceramic membrane material wherein oxygen anions can diffuse readily under an oxygen activity gradient, typically when the oxygen ion conductivity is at least 0.001 S/cm, where S the conductivity in siemens expressed as $ohm^{-1}$. The term "a temperature sufficient to provide anion mobility" is defined as a temperature at which the oxygen ion conductivity is greater than about 0.001 S/cm and more specifically greater than about 0.01 S/cm. A time period sufficient to provide anion mobility is defined as at least one diffusion time constant, and typically more than two diffusion time constants, where the diffusion time constant is defined as $L^2/D_v$ where L is the solid state diffusion distance and $D_v$ is the oxygen vacancy diffusivity.

The term "essentially constant oxygen stoichiometry" is defined by an oxygen vacancy fraction that does not vary by more than 3% of the mean value and typically does not vary by more than 0.5% of the mean value.

As used herein, the generic term "oxygen" includes all forms of oxygen comprising the element or moiety having an atomic number of 8. The generic term oxygen therefore includes oxygen ions, gaseous oxygen (dioxygen or $O_2$), and oxygen that exists in compounds in the gaseous, liquid, or solid state. The term "oxygen partial pressure" as used herein is the usual thermodynamic definition of the partial pressure of dioxygen or $O_2$ in a gas mixture containing $O_2$ and/or other gaseous compounds containing oxygen.

The reactant side of catalyzed ion transport membrane is defined as the side that is in contact with a reactant gas. A reactant gas is defined as a gas comprising one or more reactive components that participate in any of the reactions that occur on or adjacent the reactant side of the membrane. The reactions in the reactant zone may occur (1) between oxygen permeated through the membrane and any of the reactive components and (2) among any of the reactive components or reaction intermediates. These reactions form reaction products that may be withdrawn as product gas from the reactor system. In one embodiment of the invention, for example, the catalyzed membranes may have catalyst on the reactant sides of the membranes and may be used in an oxidation reactor system for generation of a synthesis gas product comprising hydrogen and carbon monoxide from a hydrocarbon-containing feed gas.

A reducing gas or reducing gaseous stream is defined as a gas comprising one or more oxidizable components that can react with components in a mixed conducting metal oxide material to reduce the oxygen stoichiometry or composition of the mixed conducting metal oxide material. An example of a reducing gas is a gas comprising one or more reducing components selected from the group consisting hydrogen, carbon monoxide, methane, ethane, and mixtures thereof. Any of these components can react with a mixed conducting metal oxide material to reduce the oxygen stoichiometry. A non-reducing gas or non-reducing gaseous stream is a gas that contains essentially no reducing components.

The term "contacting" as applied to a gas stream and an ion transport membrane means passing or flowing the gas stream over the surfaces of the ion transport membrane in any appropriate reaction vessel having at least a gas inlet and a gas outlet. The reaction vessel may have a heating system adapted to heat the vessel and contents of the vessel under controlled conditions, e.g., heating at one or more temperature ramp rates, maintaining the temperature at a desired level, and cooling at one or more temperature ramp rates. Chemical reactions may take place between components in the gas stream and components in the membrane material; alternatively, the gas stream may be inert and serve to protect the membrane material during heating or cooling.

The terms "calcine" and "calcining" are defined as a heating step to produce a chemical change such as decomposing a precursor metal salt or metal compound to a metal or metal oxide. The adjective "calcined" describes a catalyzed ion transport membrane that has been subjected to a calcining step.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The catalyzed ion transport membranes described herein may be used in any type of mixed conducting multicomponent metallic oxide ion transport membrane module or system known in the art. Exemplary types of known ion transport membrane modules may include but are not limited to the ion transport membrane module and vessel systems described in U.S. Pat. No. 7,179,323 and the planar ceramic membrane assembly and oxidation reactor systems described in U.S. Pat. No. 7,279,027. Ion transport membrane modules that may be used with catalyzed ion transport membranes according to embodiments of the present invention include but are not limited to the mixed conducting membranes described in U.S. Pat. No. 6,492,290. The complete disclosures U.S. Pat. Nos. 6,492,290, 7,179,323, and 7,279,027 are incorporated herein by reference.

Embodiments of the present invention may be applied, for example, to the planar ceramic membrane modules described in U.S. Pat. No. 7,279,027 cited above. Each of these modules comprises a plurality of membrane wafers assembled in a stack or module, and a plurality of the modules may be installed in a reactor pressure vessel with appropriate manifolds for introducing oxidant gas and reactant gas to the modules and withdrawing oxygen-depleted oxidant gas and reaction products from the modules.

Each of the wafers comprises a dense layer of mixed-conducting multi-component metal oxide material that has a first side and a second side, a porous layer of mixed-conducting multi-component metal oxide material in contact with the first side of the dense layer, and a ceramic channeled support layer in contact with the second side of the dense layer. The composite layers form an individual ion transport membrane. Two layers are joined and sealed around the edges such that a cavity is formed between the second sides of the two layers with the channeled support layers disposed within the cavity. The first sides of the dense layers have respective contiguous layers of porous mixed-conducting multi-component metal oxide material. The internal cavity has appropriate inlet and outlet ports formed by the particular structures of the two respective composite layers. This assembly of layers thus forms a wafer having an internal cavity or internal region adjacent the first sides of the layers and an external region covered with the contiguous porous layers. The internal cavity or region of the wafer has appropriate inlet and outlet ports formed by the particular structures of the two respective composite layers.

A plurality of wafers is assembled into a stack or module with formed internal manifolds adapted to introduce oxidant gas into the interior regions of the wafers and to withdraw oxygen-depleted oxidant gas from the interior regions. As described below, catalyst that promotes the reactions taking place in the exterior regions may be applied to the first sides of the dense layers and/or the adjacent porous layers in selected steps in the wafer and stack fabrication procedure. When used in reaction systems for making synthesis gas comprising hydrogen and carbon monoxide from a hydrocarbon feed gas, for example, air is introduced into the internal regions of the wafers in the module and hydrocarbon reactant gas is passed over the exterior regions (i.e., the reactant or process sides of the membranes) of the wafers in the module. Oxygen selectively diffuses through the dense layers and reacts with the hydrocarbon feed gas on the reactant sides of the wafers to produce synthesis gas components, the catalyst promotes the reactions taking place on the reactant sides of the wafers, oxygen-depleted air is withdrawn from the interior regions of the wafers in the module, and synthesis gas and possibly unreacted hydrocarbons are withdrawn from the reactant sides of the wafers in the module.

The modules described above may be fabricated according to several different embodiments of the invention. These are summarized below.

(1) Fabricate the wafers, apply catalyst to the exterior regions of the wafers, assemble a stack or module comprising a plurality of the catalyzed wafers, and treat the module with a reducing gas to yield an essentially constant oxygen stoichiometry of the mixed-conducting multi-component metal oxide material in the module.

(2) Fabricate the wafers, assemble a stack or module comprising a plurality of wafers, apply catalyst to the exterior regions of the wafers, and treat the module with a reducing gas to yield an essentially constant oxygen stoichiometry of the mixed-conducting multi-component metal oxide material in the module.

(3) Fabricate the wafers, assemble a stack or module comprising a plurality of wafers, treat the module with a reducing gas to yield an essentially constant oxygen stoichiometry of the mixed-conducting multi-component metal oxide material in the module, and apply catalyst to the exterior regions of the wafers in the module.

In the fabrication options described above, the application of catalyst and the reduction treatment of each membrane to yield an essentially constant oxygen stoichiometry may be carried out by either of the following procedures.

(A) Reduction followed by catalyst application:
(1) contact each ion transport membrane with a non-reducing gaseous stream having a first oxygen partial pressure while heating the ion transport membrane to a temperature and for a time period sufficient to provide an ion transport membrane possessing anion mobility;
(2) contact each ion transport membrane possessing anion mobility with a first reducing gaseous stream having a second oxygen partial pressure that is less than the first oxygen partial pressure for a time period sufficient to provide an ion transport membrane having anion mobility and essentially constant oxygen stoichiometry;
(3) cool each ion transport membrane having anion mobility and essentially constant oxygen stoichiometry while contacting the membrane with the first reducing gaseous stream to provide an ion transport membrane having essentially constant oxygen stoichiometry and no anion mobility; and
(4) apply a catalyst to at least one of the second side of the dense mixed conducting multicomponent metallic oxide layer and the porous mixed conducting multicomponent metallic oxide layer of each ion transport membrane having essentially constant oxygen stoichiometry and no anion mobility, thereby providing the catalyzed ion transport membrane.

(B) Catalyst application followed by reduction:
(1) apply a catalyst to at least one of the second side of the dense mixed conducting multicomponent metallic oxide layer and the porous mixed conducting multicomponent metallic oxide layer of each membrane to provide a catalyzed ion transport membrane;
(2) contact each catalyzed ion transport membrane with a non-reducing gaseous stream having a first oxygen partial pressure while heating the catalyzed ion transport membrane to a temperature and for a time period sufficient to provide a catalyzed ion transport membrane possessing anion mobility;
(3) contact each catalyzed ion transport membrane possessing anion mobility with a first reducing gaseous stream having a second oxygen partial pressure that is less than the first oxygen partial pressure for a time period sufficient to provide a catalyzed ion transport membrane having anion mobility and essentially constant oxygen stoichiometry; and
(4) cool each catalyzed ion transport membrane having anion mobility and essentially constant oxygen stoichiometry while contacting the membrane with the first reducing gaseous stream to provide a catalyzed ion transport membrane having essentially constant oxygen stoichiometry and no anion mobility.

After completing (A) or (B), a final step may be effected by contacting each catalyzed ion transport membrane having essentially constant oxygen stoichiometry and no anion mobility with a second reducing gaseous stream and calcining the catalyzed ion transport membrane at a temperature ranging from 200° C. to 500° C. to provide a calcined catalyzed ion transport membrane.

In the above embodiments, the first non-reducing gaseous stream may comprise a component selected from the group consisting of oxygen, nitrogen, argon, helium, carbon dioxide, and mixtures thereof. The first non-reducing gaseous stream, for example, may be air. The first reducing gaseous stream and/or the second reducing gaseous stream may comprise a reducing component selected from the group consisting of hydrogen, carbon monoxide, methane, ethane, and mixtures thereof.

The catalyst applied to the membrane may comprise a metal or an oxide of a metal selected from Groups II, III, IV, V, VI, VII, VIII, IX, X, XI, XV and the F block lanthanides of the Periodic Table of the Elements. In particular, the metal or the oxide of the metal may be selected from the group consisting of bismuth, barium, cerium, yttrium, zirconium, vanadium, molybdenum, cerium, manganese, praseodymium, platinum, palladium, rhodium, iron, ruthenium, iridium, gold, nickel, cobalt, copper, silver and mixtures thereof.

The catalyst may be applied to a membrane or wafer by any method of catalyst impregnation known in the art. For example, the catalyst may be applied as a solution of soluble metal salts, metal organic compounds, metallic oxide and mixtures thereof followed by calcination of the membrane or wafer. In one embodiment, this may include contacting a catalyzed ion transport membrane having essentially constant oxygen stoichiometry and no anion mobility with a second reducing gaseous stream and calcining the catalyzed ion transport membrane at a temperature ranging from 200° C. to 500° C. to provide a calcined catalyzed ion transport membrane. The second reducing gaseous stream may comprise a reducing component selected from the group consisting of hydrogen, carbon monoxide, methane, ethane and mixtures thereof.

The mixed conducting multicomponent metallic oxide in either or both of the dense layer and the porous layer may comprise at least one mixed conducting multicomponent metallic oxide represented by the formula $(La_xCa_{1-x})_yFeO_{3-\delta}$, wherein $1.0>x>0.5$, $1.1 \geq y \geq 1.0$, and $\delta$ is a number which renders the composition of matter charge neutral.

Embodiments of the invention described above are illustrated by, but are not limited by, the following Examples.

EXAMPLE 1

Fabrication and Reduction of an ITM Module and Test Bars Made of $La_{0.9}Ca_{0.1}FeO_{3-\delta}$ An ion transport membrane (ITM) module was constructed according to methods described in earlier-cited U.S. Pat. No. 7,279,027, and all components of the module were formed of material having a composition of $La_{0.9}Ca_{0.1}FeO_{3-\delta}$ where $\delta$ is a number to make the compound charge neutral. The module was 3.5 inches wide, 5 inches long, and 2 inches thick, and was fitted with an inlet line adapted to introduce air into the interior region of the module and an outlet line to withdraw oxygen-depleted air from the interior region.

The porous layers of the module were impregnated with a suspension of nanoparticles of $CeO_2$—$ZrO_2$ in water (Nanophase Technologies Corporation) and dried at 300° C. in $N_2$; the layers were then impregnated with a solution of Rh nitrate and tetra amine Pd nitrate, calcined at 500° C. at 0.5° C./min in $N_2$, and cooled to room temperature at 0.5° C./min. The catalyst content of the entire module was 259 mg $CeO_2$, 139 mg $ZrO_2$, 47.6 mg Rh, and 47.6 mg Pd.

Thirty-nine dense bars of $La_{0.9}Ca_{0.1}FeO_{3-\delta}$ with dimensions of 50 mm×3 mm×4 mm were made by pressing powder of the same composition into a bar shape and sintering at 1400° C. in air for 5 hours, followed by cooling in air to room temperature at 1° C./min. Fifteen of the bars were coated with a suspension of nanoparticles of $CeO_2$—$ZrO_2$ in water (Nanophase Technologies Corporation) and dried at 300° C. in $N_2$. The coated bars where then dipped in a solution of Rh nitrate and tetra amine Pd nitrate in water, calcined at 500° C. at 0.5° C./min in $N_2$, and cooled to room temperature at 0.5° C./min. The remaining twenty-four bars did not have catalyst applied to them.

The membrane module, five of the catalyzed bars, and three of the bars that were not catalyzed were placed in a gas-tight retort in a furnace and processed as described below. Ten of the catalyzed bars were not processed. The module and test bars were heated in dry air at 0.5° C./min to 900° C. and held at 900° C. for 5 hours in air at 500 sccm.

Nitrogen Equilibration

The air flow to the retort was ramped or decreased linearly from 500 sccm to 0 sccm, and nitrogen flow was ramped or increased linearly from 0 to 1000 sccm over a time period of 7 hours. During this time period, the air and nitrogen gas flows were bubbled through water at room temperature to humidify the gases before introduction into the retort. The bars and module then were held in the nitrogen atmosphere at 900° C. for 18 hours.

100 ppm Hydrogen Equilibration

The nitrogen flow was ramped or decreased linearly from 1000 sccm to 0 sccm, and flow of a reducing gas mixture of 100 ppm $H_2$/balance $N_2$ was ramped or increased linearly from 0 to 500 sccm over 5 hours. The nitrogen and $H_2/N_2$ gas mixtures were bubbled through water at room temperature to humidify the gases before introduction into the retort. The bars and module then were held in the 100 ppm $H_2$/balance $N_2$ gas mixture for 19 hours at 900° C. The term "ppm" as used in all Examples herein means parts per million by volume.

1000 ppm Hydrogen Equilibration

The 100 ppm $H_2$/balance $N_2$ gas flow was ramped or decreased linearly from 500 sccm to 0 sccm, and flow of a reducing gas mixture of 1000 ppm $H_2$/balance $N_2$ was increased linearly from 0 to 500 sccm over 5 hours. The $H_2/N_2$ gas was bubbled through water at room temperature to humidify the gas before introduction into the retort. After the 5 hours, the bars and module were held in the 1000 ppm $H_2$/balance $N_2$ gas mixture for 19 hours at 900° C.

5000 ppm Hydrogen Equilibration

The 1000 ppm $H_2$/balance $N_2$ gas flow was ramped or decreased linearly from 500 sccm to 0 sccm, and flow of a reducing gas mixture of 5000 ppm $H_2$/balance $N_2$ was ramped or increased linearly from 0 to 5000 sccm over 5 hours. The $H_2/N_2$ gas was bubbled through water at room temperature to humidify the gas before introduction into the retort. After the 5 hours, the bars and module then were held in the 5000 ppm $H_2$/balance $N_2$ gas mixture for 19 hours at 900° C. The bars and module then were ramped or cooled linearly to room temperature at 0.5° C./min in humidified 5000 ppm $H_2$/bal $N_2$ gas and were removed from the retort.

The bars and module made by this method may be described as preconditioned, prereduced, or pretreated articles.

EXAMPLE 2

Start-Up of a Preconditioned Catalyzed ITM Module for Syngas Production

After completion of the preconditioning reduction process described in Example 1, the module was installed in a laboratory reactor vessel for use as an ITM syngas reactor with gas inlet and gas outlet piping connected to the oxidant inlet and oxidant outlet lines of the module. Since air typically is the oxidant gas in ITM syngas reactors, the oxidant side of the membrane module will be described here as the air side. The reactor was fitted with inlet and outlet lines for gas flow over the exterior region, i.e., the reactant or process side, of the module. The reactant side and air side of the reactor then were purged with nitrogen long enough to reduce the oxygen concentration in the purge outlet of both streams to less than 50 ppm. Water bubblers were installed on the air feed and reactant side inlet piping and purged with nitrogen to remove dissolved oxygen and any air trapped in the head space.

A 500 sccm flow of 1000 ppm $H_2$/balance $N_2$ was bubbled through water and passed through the reactant or process side of the module, and the pressure on the process side was increased to 60 psig. A 500 sccm flow of 5000 ppm $H_2$/balance $N_2$ was bubbled through water and passed through the air side of the module. The module then was heated at 0.5° C./min to 900° C. and held at 900° C.

Air Side Gas Composition Change No. 1

The gas composition on the air side of the module was changed over 5 hours by blending out the 5000 ppm $H_2$/balance $N_2$ bubbled through water and blending in 1000 ppm $H_2$/balance $N_2$ bubbled through water. The total flow rate on the air side of the module remained at 500 sccm. At the end of the gas change or ramp, the module was held at these conditions for 19 hours at 900° C.

Air Side Gas Composition Change No. 2

The gas composition on the air side was then changed over 5 hours by blending out the 1000 ppm $H_2$ bubbled through water and blending in 100 ppm $H_2$ bubbled through water. The total flow rate on the air side of the module remained at 500 sccm. At the end of the gas change or ramp, the module was held at these conditions for 19 hours at 900° C.

Air Side Gas Composition Change No. 3

The gas composition on the air side of the module was then changed over 5 hours by blending out the 100 ppm $H_2$ bubbled through water and blending in nitrogen bubbled through water. The total flow rate on the oxidant fed side of the module remained at 500 sccm. At the end of the gas change or ramp, the gas feed was switched to dry nitrogen by bypassing the bubbler. The module was held for 19 hours at 900° C. with dry nitrogen flowing through the air side.

Air Side Gas Composition Change No. 4

The gas composition on the air side of the module then was changed over 15 hours by blending out the nitrogen and blending in 1000 ppm $O_2$/balance $N_2$. The total flow rate on the air side of the module remained at 500 sccm. At the end of the gas change, the module was held at those conditions for 19 hours at 900° C.

Air Side Gas Composition Change No. 5

Over 1 hour, air was blended in to the 1000 ppm $O_2$/balance $N_2$ flow to achieve a 4000 ppm $O_2$ mix. The total flow rate on the air side of the module remained at 500 sccm.

Air Side Gas Composition Change No. 6

The gas composition on the air side of the module then was changed over 5 hours by blending out the 1000 ppm $O_2$/balance $N_2$ gas mix and blending in air. The total flow rate on the air side of the module remained at 500 sccm. At the end of the gas change or ramp, the module was held at those conditions for 19 hours at 900° C.

During the entire process described above, the module remained leak tight and did not suffer any mechanical breakage or damage.

EXAMPLE 3

Start-Up of a Non-Preconditioned Catalyzed ITM Module for Syngas Production

A module identical to the module that was preconditioned in Example 1 and used in Example 2 was fabricated and cooled from a joining temperature of 1200° C. in air at 0.5° C./min. The ITM syngas module then was impregnated with catalyst in the same manner as the module of Example 1, but it was not preconditioned by contact with reducing gas. After the catalyst was applied, the module was installed in the ITM syngas reactor with gas inlet and gas outlet piping connected to the air inlet and air outlet lines of the module.

The process side and air side of the module were purged with nitrogen long enough to reduce the oxygen concentration in the outlet of both streams to less than 50 ppm. Water bubblers were installed on the oxidant and reactant side inlet piping and were purged with nitrogen to remove dissolved oxygen and any air trapped in the head space. A 500 sccm flow of 1000 ppm $H_2$/balance $N_2$ was bubbled through water and passed through the process side of the module, and the pressure therein was increased to 60 psig. A 500 sccm flow of 5000 ppm $H_2$/balance $N_2$ was bubbled through water and passed through the air side of the module.

The module was then heated from room temperature at 0.5° C./min under continuing gas flow. When the temperature reached about 90° C., the module failed by breaking into numerous pieces.

EXAMPLE 4

Strength Testing of Bars

Strength testing was carried out for the following test bars of Example 1: the 10 catalyzed but not preconditioned bars, the 5 catalyzed and preconditioned bars, the 3 preconditioned but not catalyzed bars, and the 21 bars that were neither preconditioned nor catalyzed. The strengths of the bars were measured using a standard 4-point flexure geometry using the protocol of ASTM C1161-94 and ASTM C1211-92. The outer load point span was 40 mm and the inner load point span was 20 mm. The 10 catalyzed but not preconditioned bars, the 5 catalyzed and preconditioned bars, and the 3 preconditioned but not catalyzed bars were heated to 450° C. in an atmosphere of 2.5% $H_2O$, 5% $H_2$, balance Ar. The hydrogen in this atmosphere represented oxidizable impurities in the gas phase. The strength of each bar was measured at 450° C. after holding the bars in this atmosphere for 18 hours. The strengths of the 21 bars that were neither catalyzed nor pretreated were measured at room temperature.

The strength test results given in Table 3 below. The bars that were catalyzed but not pretreated had strengths below the resolution of the measuring device, which is approximately 20 MPa, and therefore were untestable. The catalyzed bars that were pretreated had a measured strength that was within 1 standard deviation of the room temperature strength of the bars that were neither catalyzed nor pretreated. These results show that the preconditioning of catalyzed bars of $La_{0.9}Ca_{0.1}FeO_{3-x}$ preserves the strength of the material as measured when the material is contacted with dilute oxidizable impurities in the gas phase.

TABLE 3

Strength of Test Bars of $La_{0.9}Ca_{0.1}FeO_{3-x}$

| Test Bars Description | Number of bars | Strength Test Temperature (° C.) | Average Strength (MPa) | Std. Deviation (MPa) |
|---|---|---|---|---|
| Not catalyzed and not preconditioned | 21 | Room temperature | 201 | 26 |
| Not catalyzed and not preconditioned | 3 | 450 | 139 | 27 |
| Catalyzed and not preconditioned | 10 | 450 | Not testable | — |
| Catalyzed and preconditioned | 5 | 450 | 191 | 20 |

EXAMPLE 5

Preconditioning Prior to Catalyst Impregnation

An ITM syngas module was constructed according to methods described in earlier-cited U.S. Pat. No. 7,279,027, and all components of the module were formed of material having a composition of $La_{0.9}Ca_{0.1}FeO_{3-\delta}$ where $\delta$ is a number to make the compound charge neutral. The module was 3.5 inches wide, 5 inches long, and 2 inches thick, and was fitted with an inlet line adapted to introduce air into the interior region of the module and an outlet line to withdraw oxygen-depleted air from the interior region. The module was place in a gas tight retort in a furnace, heated in dry air at 0.5° C./min to 900° C., and held at 900° C. for 5 hours in air.

Nitrogen Equilibration

The air flow to the retort was ramped from 500 sccm to 0 sccm and nitrogen flow was ramped from 0 to 1,000 sccm over 7 hours. During this time, the combined air and nitrogen gas flows were bubbled through water. After the 7 hours the module was held in the nitrogen atmosphere at 900° C. for 18 hours.

100 ppm $H_2$ Equilibration

The nitrogen flow was ramped from 1,000 sccm to 0 sccm and a gas mixture of 100 ppm $H_2$/balance $N_2$ was ramped from 0 to 500 sccm over 5 hours. The combined nitrogen and $H_2/N_2$ gas mixture was bubbled through room temperature water. After the hours, the module was held in the 100 ppm $H_2$/balance $N_2$ gas mixture for 19 hours.

1000 ppm $H_2$ Equilibration

The 100 ppm $H_2$/bal $N_2$ flow was next ramped from 500 sccm to 0 sccm and a gas mixture of 1,000 ppm $H_2$/balance $N_2$ was ramped from 0 to 500 sccm over 5 hours. The combined $H_2/N_2$ gas mixtures were bubbled through room temperature water. After the 5 hours, the bars and module were held in the 1,000 ppm $H_2$/balance $N_2$ gas mixture for 19 hours.

5,000 ppm $H_2$ Equilibration

The 1,000 ppm $H_2$/bal $N_2$ flow was next ramped from 500 sccm to 0 sccm and a gas mixture of 5,000 ppm $H_2$/balance $N_2$ was ramped from 0 to 500 sccm over 5 hours. The combined $H_2/N_2$ gas mixtures were bubbled through room temperature water. After the 5 hours, the module was held in the 5000 ppm $H_2$/balance $N_2$ gas mixture for 19 hours.

The module then was ramped to room temperature at 0.5° C./min in humidified 5000 ppm $H_2$/bal $N_2$. The reduced preconditioned module was removed from the retort.

The porous layers of the preconditioned module were impregnated with a suspension of nanoparticles of $CeO_2$—$ZrO_2$ in water (Nanophase Technologies Corporation) and dried at 300° C. in a gas tight retort in an atmosphere of 5000 ppm $H_2$ in a balance of $N_2$. The porous layers of the module then were impregnated with a solution of Rh nitrate and tetra amine Pd nitrate, calcined at 500° C. at 0.5 cc/min in a gas tight retort in an atmosphere of 5000 ppm $H_2$/balance $N_2$ and cooled to room temperature at 0.5° C./min. The weights of the catalyst components impregnated on the module were 259 mg $CeO_2$, 139 mg $ZrO_2$, 47.6 mg Rh, and 47.6 mg Pd.

EXAMPLE 6

Start-Up of a Catalyzed Preconditioned ITM Syngas Module

The ITM syngas module that was preconditioned in Example 5 was installed in an ITM Syngas reactor. Since air typically is the oxidant gas in ITM syngas reactors, the oxidant side of the membrane module is described here as the air side. The module was fitted with an inlet line adapted to introduce air into the interior region of the module and an outlet line to withdraw oxygen-depleted air from the interior region. Gas inlet and gas outlet piping of the reactor was plumbed to the air inlet and air outlet of the module. The reactant or process side and the air feed side of the reactor then were both purged with nitrogen long enough to lower the oxygen concentration in the outlet of both streams to less than 50 ppm.

Water bubblers on the air feed and process side inlet piping were also purged with nitrogen to remove dissolved oxygen and any air trapped in the head space.

A 500 sccm flow of 1,000 ppm $H_2$/balance $N_2$ bubbled through water was established on the process side. The process side pressure was increased to 60 psig and a 500 sccm flow of 5,000 ppm $H_2$/balance $N_2$ bubbled through water was established through the air feed side of the module. The module then was heated at 0.5° C./min to 900° C. and then held at 900° C.

Air Side Change No. 1

The gas composition on the air feed side of the module was then changed over 5 hours by blending out the 5,000 ppm $H_2$/balance $N_2$ bubbled through water and blending in 1,000 ppm $H_2$/balance $N_2$ bubbled through water. The total flow rate on the air feed side of the module remained at 500 sccm.

At the end of the ramp, the module was held for 19 hours.

Air Side Change No. 2

The gas composition on the air feed side of the module was then changed over 5 hours by blending out the 1,000 ppm $H_2$ bubbled through water and blending in 100 ppm $H_2$ bubbled through water. The total flow rate on the air feed side of the module remained at 500 sccm.

At the end of the ramp, the module was held for 19 hours.

Air Side Change No. 3

The gas composition on the air feed side of the module was then changed over 5 hours by blending out the 100 ppm $H_2$ bubbled through water and blending in nitrogen bubbled through water. The total flow rate on the air feed side of the module remained at 500 sccm.

At the end of the ramp, the gas feed was switched to dry nitrogen by bypassing the bypass bubbler and the module was held for 19 hours.

Air Side Change No. 4

The gas composition on the air feed side of the module was then changed over 15 hours by blending out the nitrogen and blending in 1000 ppm $O_2$/balance $N_2$. The total flow rate on the air feed side of the module remained at 500 sccm.

At the end of the ramp, the module was held for 19 hours.

Air Side Change No. 5

Over 1 hour, air was blended into the 1,000 ppm $O_2$/balance $N_2$ flow to achieve a 4,000 ppm $O_2$ mix. The total flow rate on the air feed side of the module remained at 500 sccm.

Air Side Change No. 6

The gas composition on the air feed side of the module was then changed over 5 hours by blending out the 1,000 ppm $O_2$/balance $N_2$ gas mix and blending in air. The total flow rate on the air feed side of the module remained at 500 sccm. At the end of the ramp, the module was held for 19 hours.

During the entire process carried out in this Example, the module remained leak tight and did not suffer any damage.

The above Examples illustrate that the problem of destructive uncontrolled catalytic reduction in ion transport membrane modules by oxidizable impurities can be avoided by utilizing embodiments of the present invention wherein the materials in the membrane modules are reduced under controlled conditions prior to use of the modules in reactor vessels under operating conditions.

The invention claimed is:

1. A process for fabricating a catalyzed ion transport membrane comprising
   (a) providing an ion transport membrane comprising a dense mixed conducting multicomponent metallic oxide layer having a first side, a second side, and a porous mixed conducting multicomponent metallic oxide layer contiguous with the first side;
   (b) contacting the ion transport membrane with a non-reducing gaseous stream having a first oxygen partial pressure while heating the ion transport membrane to a temperature and for a time period sufficient to provide an ion transport membrane possessing anion mobility;
   (c) contacting the ion transport membrane possessing anion mobility with a first reducing gaseous stream having a second oxygen partial pressure that is less than the first oxygen partial pressure for a time period sufficient to provide an ion transport membrane having anion mobility and essentially constant oxygen stoichiometry;
   (d) cooling the ion transport membrane having anion mobility and essentially constant oxygen stoichiometry while contacting the membrane with the first reducing gaseous stream to provide an ion transport membrane having essentially constant oxygen stoichiometry and no anion mobility; and
   (e) applying a catalyst to at least one of the second side of the dense mixed conducting multicomponent metallic oxide layer and the porous mixed conducting multicomponent metallic oxide layer of the ion transport membrane that has essentially constant oxygen stoichiometry and no anion mobility, thereby providing the catalyzed ion transport membrane.

2. The process of claim 1 wherein the first non-reducing gaseous stream comprises a component selected from the group consisting of oxygen, nitrogen, argon, helium, carbon dioxide, and mixtures thereof.

3. The process of claim 1 wherein the first non-reducing gaseous stream is air.

4. The process of claim 1 wherein the first reducing gaseous stream comprises a reducing component selected from the group consisting of hydrogen, carbon monoxide, methane, ethane, and mixtures thereof.

5. The process of claim 1 wherein the catalyst comprises a metal or an oxide of a metal selected from Groups II, III, IV, V, VI, VII, VIII, IX, X, XI, XV and the F block lanthanides of the Periodic Table of the Elements.

6. The process of claim 5 wherein the metal or the oxide of the metal is selected from the group consisting of bismuth, barium, cerium, yttrium, zirconium, vanadium, molybdenum, cerium, manganese, praseodymium, platinum, palladium, rhodium, iron, ruthenium, iridium, gold, nickel, cobalt, copper, silver and mixtures thereof.

7. The process of claim 5 or 6 wherein the catalyst is applied as a solution comprising a component selected from the group consisting of soluble metal salts, metal organic compounds, metallic oxides, and mixtures thereof.

8. The process of claim 1 further comprising:
   (f) contacting the catalyzed ion transport membrane having essentially constant oxygen stoichiometry and no anion mobility with a second reducing gaseous stream and calcining the catalyzed ion transport membrane at a temperature ranging from 200° C. to 500° C. to provide a calcined catalyzed ion transport membrane.

9. The process of claim 8 wherein the second reducing gaseous stream comprises a reducing component selected from the group consisting of hydrogen, carbon monoxide, methane, ethane and mixtures thereof.

10. The process of claim 1 wherein at least one of the dense mixed conducting multicomponent metallic oxide layer and the porous mixed conducting multicomponent metallic oxide layer comprises at least one mixed conducting multicomponent metallic oxide represented by the formula $(La_xCa_{1-x})_yFeO_{3-\delta}$, wherein $1.0 > x > 0.5$, $1.1 \geq y \geq 1.0$, and $\delta$ is a number which renders the composition of matter charge neutral.

11. A process for fabricating a catalyzed ion transport membrane having essentially constant oxygen stoichiometry and no anion mobility comprising
   (a) providing an ion transport membrane comprising a dense mixed conducting multicomponent metallic oxide layer having a first side, a second side, and a porous mixed conducting multicomponent metallic oxide layer contiguous with the first side;
   (b) applying a catalyst to at least one of the second side of the dense mixed conducting multicomponent metallic oxide layer and the porous mixed conducting multicomponent metallic oxide layer to provide the catalyzed ion transport membrane;
   (c) contacting the catalyzed ion transport membrane with a non-reducing gaseous stream having a first oxygen partial pressure while heating the catalyzed ion transport membrane to a temperature and for a time period sufficient to provide a catalyzed ion transport membrane possessing anion mobility;
   (d) contacting the catalyzed ion transport membrane possessing anion mobility with a first reducing gaseous stream having a second oxygen partial pressure that is less than the first oxygen partial pressure for a time period sufficient to provide a catalyzed ion transport membrane having anion mobility and essentially constant oxygen stoichiometry; and (e) cooling the catalyzed ion transport membrane having anion mobility and essentially constant oxygen stoichiometry while contacting the membrane with the first reducing gaseous stream to provide a catalyzed ion transport membrane having essentially constant oxygen stoichiometry and no anion mobility.

12. The process of claim 11 wherein the first non-reducing gaseous stream comprises a component selected from the group consisting of oxygen, nitrogen, argon, helium, carbon dioxide, and mixtures thereof.

13. The process of claim 11 wherein the first non-reducing gaseous stream is air.

14. The process of claim 11 wherein the first reducing gaseous stream comprises a reducing component selected from the group consisting of hydrogen, carbon monoxide, methane, ethane and mixtures thereof.

15. The process of claim 11 wherein the catalyst comprises a metal or an oxide of a metal selected from Groups II, III, IV, V, VI, VII, VIII, IX, X, XI, XV and the F block lanthanides of the Periodic Table of the Elements.

16. The process of claim 15 wherein the metal or the oxide of the metal is selected from the group consisting of bismuth, barium, cerium, yttrium, zirconium, vanadium, molybdenum, cerium, manganese, praseodymium, platinum, palladium, rhodium, iron, ruthenium, iridium, gold, nickel, cobalt, copper, silver and mixtures thereof.

17. The process of claim 15 or 16 wherein the catalyst is applied as a solution comprising a component selected from the group consisting of soluble metal salts, metal organic compounds, metallic oxides, and mixtures thereof.

18. The process of claim 11 further comprising:

(f) contacting the catalyzed ion transport membrane having essentially constant oxygen stoichiometry and no anion mobility with a second reducing gaseous stream and calcining the catalyzed ion transport membrane at a temperature ranging from 200° C. to 500° C. to provide a calcined catalyzed ion transport membrane.

19. The process of claim 18 wherein the second reducing gaseous stream comprises a reducing component selected from the group consisting of hydrogen, carbon monoxide, methane, ethane and mixtures thereof.

20. The process of claim 11 wherein at least one of the dense mixed conducting multicomponent metallic oxide layer and the porous mixed conducting multicomponent metallic oxide layer comprises at least one mixed conducting multicomponent metallic oxide represented by the formula $(La_xCa_{1-x})_yFeO_{3-\delta}$, wherein $1.0>x>0.5$, $1.1 \geq y \geq 1.0$, and $\delta$ is a number which renders the composition of matter charge neutral.

* * * * *